United States Patent
Ojanpera

(10) Patent No.: US 9,479,887 B2
(45) Date of Patent: Oct. 25, 2016

(54) METHOD AND APPARATUS FOR PRUNING AUDIO BASED ON MULTI-SENSOR ANALYSIS

(71) Applicant: Nokia Technologies Oy, Espoo (FI)

(72) Inventor: Juha Ojanpera, Nokia (FI)

(73) Assignee: Nokia Technologies Oy, Espoo (FI)

( * ) Notice: Subject to any disclaimer, the term of this patent is extended or adjusted under 35 U.S.C. 154(b) by 636 days.

(21) Appl. No.: 13/622,414

(22) Filed: Sep. 19, 2012

(65) Prior Publication Data

US 2014/0081905 A1   Mar. 20, 2014

(51) Int. Cl.
| G06F 17/00 | (2006.01) |
| H04S 3/00 | (2006.01) |
| G06F 17/30 | (2006.01) |
| G06F 3/16 | (2006.01) |

(52) U.S. Cl.
CPC ............ *H04S 3/006* (2013.01); *G06F 3/165* (2013.01); *G06F 17/30002* (2013.01); *G06F 17/30743* (2013.01)

(58) Field of Classification Search
CPC ............... G10H 2240/175; G10H 2240/251; G10H 2240/141; G04F 17/30017; G04F 17/30743; G06F 17/30002; G06F 3/165; H04S 3/006
See application file for complete search history.

(56) References Cited

U.S. PATENT DOCUMENTS

| 7,277,692 | B1* | 10/2007 | Jones et al. ............... 455/412.1 |
| 7,525,037 | B2 | 4/2009 | Hansson et al. |
| 2005/0091275 | A1* | 4/2005 | Burges et al. ............. 707/104.1 |
| 2008/0190271 | A1* | 8/2008 | Taub et al. ........................ 84/645 |
| 2009/0068943 | A1* | 3/2009 | Grandinetti et al. ........ 455/3.06 |
| 2009/0248793 | A1 | 10/2009 | Jacobsson et al. |
| 2010/0119072 | A1 | 5/2010 | Ojanpera |
| 2010/0208901 | A1* | 8/2010 | Kawakami et al. ............ 381/56 |
| 2011/0054648 | A1 | 3/2011 | Maxwell et al. |
| 2011/0082877 | A1* | 4/2011 | Gupta et al. ................... 707/769 |
| 2012/0158164 | A1* | 6/2012 | Grand .............................. 700/94 |
| 2013/0231761 | A1* | 9/2013 | Eronen et al. .................. 700/94 |

(Continued)

FOREIGN PATENT DOCUMENTS

| WO | WO 2011/048067 A1 | 4/2011 |
| WO | WO 2011/083979 A2 | 7/2011 |

OTHER PUBLICATIONS

SAM Guide to Filed Recording | Sound and Music, dated Jun. 25, 2012, Retrieved from the Internet: <URL: http://soundandmusic.org/artist-area/artists-toolkit/how-tos/fieldrecording>, 5 pages.

(Continued)

*Primary Examiner* — Andrew C Flanders
(74) *Attorney, Agent, or Firm* — Alston & Bird LLP

(57) ABSTRACT

A method, apparatus, and computer program product are provided in order to compose audio signals for content in a multi-user environment that provide a high quality audio signal that best represents the content as captured and uploaded by the plurality of users. In the context of a method, audio and/or video content is captured and selected to be uploaded to be shared with other users. The method may analyze the audio signals for a set of uploaded content and determine segments of the analyzed signals that should be pruned. The method uses the signal pruning data to replace or enhance segments of one or more signals to generate a composed signal that is to be shared with other end users. A corresponding apparatus and a computer program product are also provided.

20 Claims, 9 Drawing Sheets

(56) References Cited

U.S. PATENT DOCUMENTS

2014/0052738 A1* 2/2014 Connell-
  Giammatteo et al. ........ 707/748
2014/0133825 A1* 5/2014 Kozloski et al. ............. 386/223

OTHER PUBLICATIONS

De Carvalho, J., *Live Multi-Track Audio Recording*, EE522 Project, Spring 2007, University of Southern California, pp. 1-11.

* cited by examiner

METHOD AND APPARATUS FOR PRUNING AUDIO BASED ON MULTI-SENSOR ANALYSIS

TECHNOLOGICAL FIELD

An example embodiment of the present invention relates generally to multi-user content and, more particularly, to the composing of audio signals in a multi-user environment.

BACKGROUND

In multi-user content sharing, users located within an environment may each capture audio and/or visual content of events occurring within the environment with their individual devices. These users may then upload the captured audio/video content to a multi-user content server, where it may be shared with other users. The capturing devices may be arbitrarily positioned throughout the event space to capture the event. Location data and/or positioning data of the devices may be captured along with the audio/visual content and uploaded to the multi-user content server. The multi-user content server may use the location and/or position data to provide various listening and/or viewing points to a user for selection when downloading/streaming the captured content. The multi-user content server may then combine the uploaded content from the plurality of devices to provide rendered event content to users. In this regard, a user may select a particular listening/viewing point for the captured event and the multi-user content server may render mixed content from the uploaded content to reconstruct the event space.

To provide multi-user rendered content for sharing with other users, content from multiple users must first be uploaded to the multi-user content server and may then be combined to provide rendered content to be shared with end users. However, the content may generally be captured by a plurality of devices and the quality may vary among the plurality of different captures of the event. For example, the plurality of devices may generally each independently capture and upload content corresponding to an event and the captured content from a particular device may contain distortions and may vary in quality as devices are moved during capturing of the audio and/or video. To provide a positive user experience of the rendered multi-user content, the uploaded content should be rendered to provide the best quality for each audio and/or video segment.

BRIEF SUMMARY

A method, apparatus and computer program product are therefore provided according to an example embodiment of the present invention in order to capture and share audio and/or video content in a multi-user environment. In this regard, the method, apparatus and computer program product of an example embodiment may compose audio signals for content in a multi-user environment that provide a high quality audio signal that best represents the content as captured and uploaded by the plurality of users. The method, apparatus and computer program product of an example embodiment may analyze the audio signals for a set of uploaded content and determine segments of the analyzed signals that should be pruned. The signal pruning data may be used to replace or enhance segments of one or more signals to generate a composed signal that is to be shared with other end users.

In one embodiment, a method is provided that at least includes receiving content data and assigning two or more corresponding content data into a set of content data. The method of this embodiment also includes generating a first pruning data set for each one of a plurality of signals within the content set and generating a second pruning data set for each one of a plurality of signals within the content set. The method of this embodiment also includes generating a composed signal from the plurality of signals in the content set using the first pruning data set and the second pruning data set; causing the composed signal to be stored; and causing transmission of the composed signal.

In one embodiment, the plurality of signals of the content set comprises audio signals. In one embodiment, the first pruning data set for the one of the plurality of signals comprises segments of said signal that are distorted. In one embodiment, the second pruning data set for the one of the plurality of signals comprises segments of said signal that are degraded.

In some embodiments, generating the first pruning data set further comprises determining an amount of saturation for a signal and wherein the amount of saturation exceeds a threshold parameter. In one embodiment, generating the first pruning data set further comprises determining a spike for a signal and wherein the energy of the signal spike exceeds a threshold parameter. In some embodiments, generating the composed signal using the first pruning data set further comprises replacing segments of the one of the plurality of signals.

In some embodiments, the generating the second pruning data set further comprises analyzing sensor data and signal characteristics for a corresponding segment of a signal. In some embodiments, the sensor data further comprises one or more of compass data, accelerometer data, or gyroscope data corresponding to a capturing period of signal content. In one embodiment, the generating the composed signal using the second pruning data set further comprises enhancing segments of the one of the plurality of signals. In some embodiments, enhancing a segment further comprises weighting corresponding segments for two or more of the plurality of signals and using the weighting during mixing of the two or more of the plurality of signals to generate a composed signal.

In another embodiment, an apparatus is provided that includes at least one processor and at least one memory including computer program instructions with the at least one memory and the computer program instructions configured to, with the at least one processor, cause the apparatus at least to receive content data and assign two or more corresponding content data into a set of content data. The at least one memory and the computer program instructions of this embodiment are also configured to, with the at least one processor, cause the apparatus to generate a first pruning data set for each one of a plurality of signals within the content set and generate a second pruning data set for each one of a plurality of signals within the content set. The at least one memory and the computer program instructions are also configured to, with the at least one processor, cause the apparatus of this embodiment to generate a composed signal from the plurality of signals in the content set using the first pruning data set and the second pruning data set; cause the composed signal to be stored; and cause transmission of the composed signal.

In a further embodiment, a computer program product is provided that includes at least one non-transitory computer-readable storage medium bearing computer program instructions embodied therein for use with a computer with the computer program instructions including program instructions configured to receive content data and assign two or more corresponding content data into a set of content data. The computer program instructions of this embodiment also include program instructions configured to generate a first pruning data set for each one of a plurality of signals within the content set and generate a second pruning data set for each one of a plurality of signals within the content set. The computer program instructions of this embodiment also include program instructions configured to generate a composed signal from the plurality of signals in the content set using the first pruning data set and the second pruning data set; cause the composed signal to be stored; and cause transmission of the composed signal.

In another embodiment, an apparatus is provided that includes at least means for receiving content data and means for assigning two or more corresponding content data into a set of content data. The apparatus of this embodiment also includes means for generating a first pruning data set for each one of a plurality of signals within the content set and means for generating a second pruning data set for each one of a plurality of signals within the content set. The apparatus of this embodiment also includes means for generating a composed signal from the plurality of signals in the content set using the first pruning data set and the second pruning data set; means for causing the composed signal to be stored; and means for causing transmission of the composed signal.

BRIEF DESCRIPTION OF THE DRAWINGS

Figure 1:
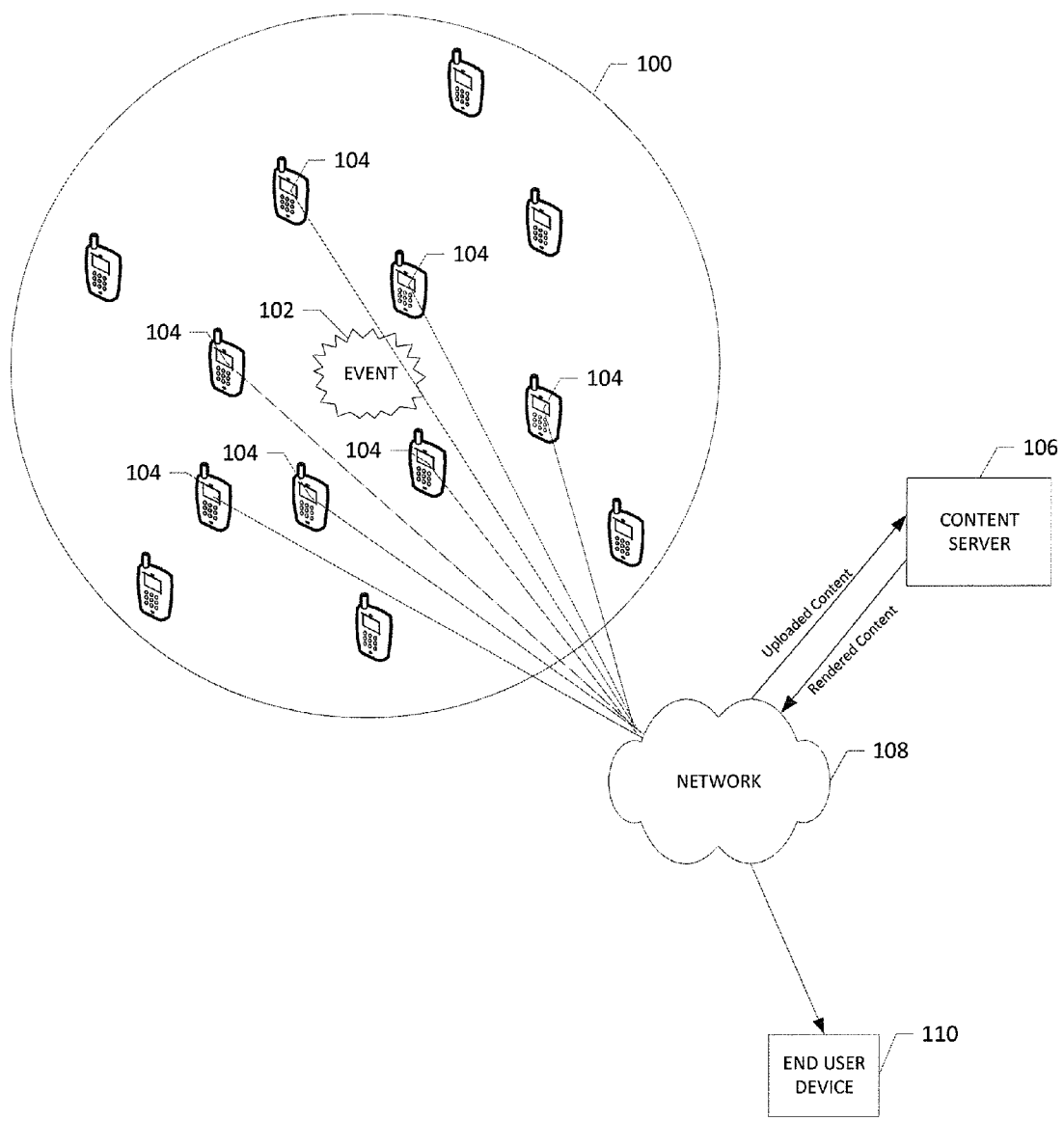
Figure 2:
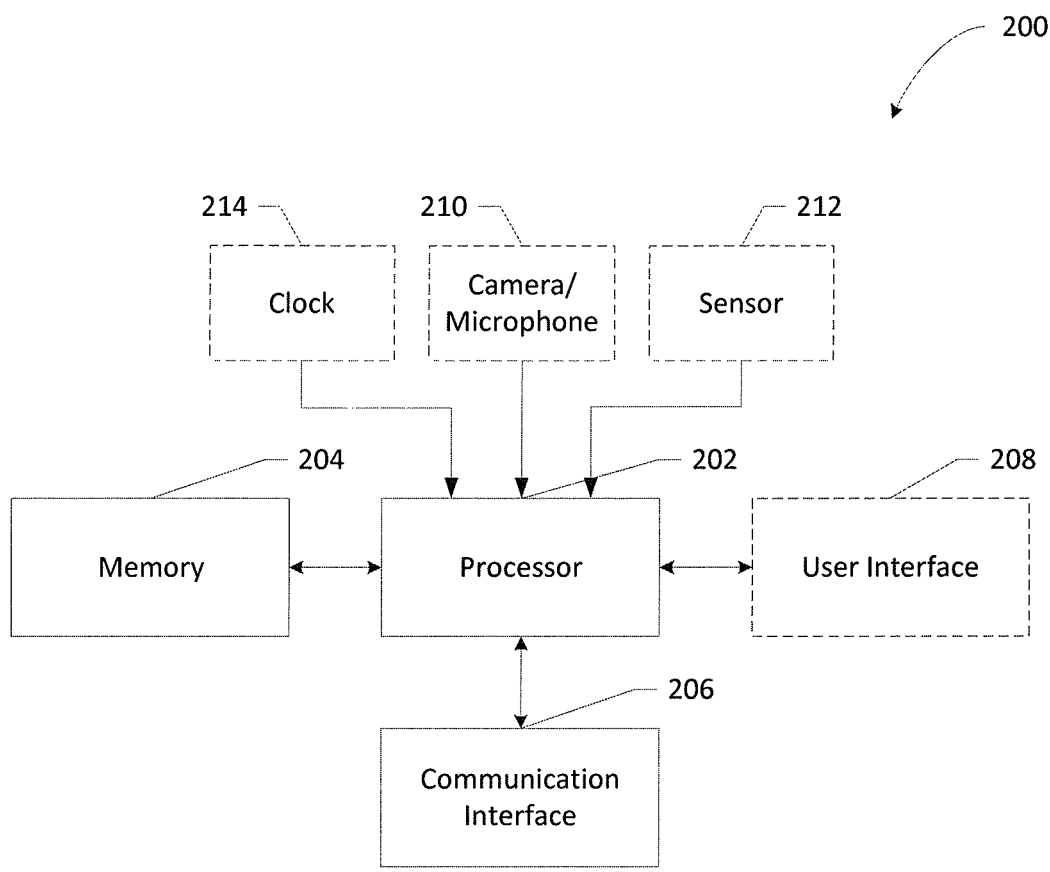
Figure 3:
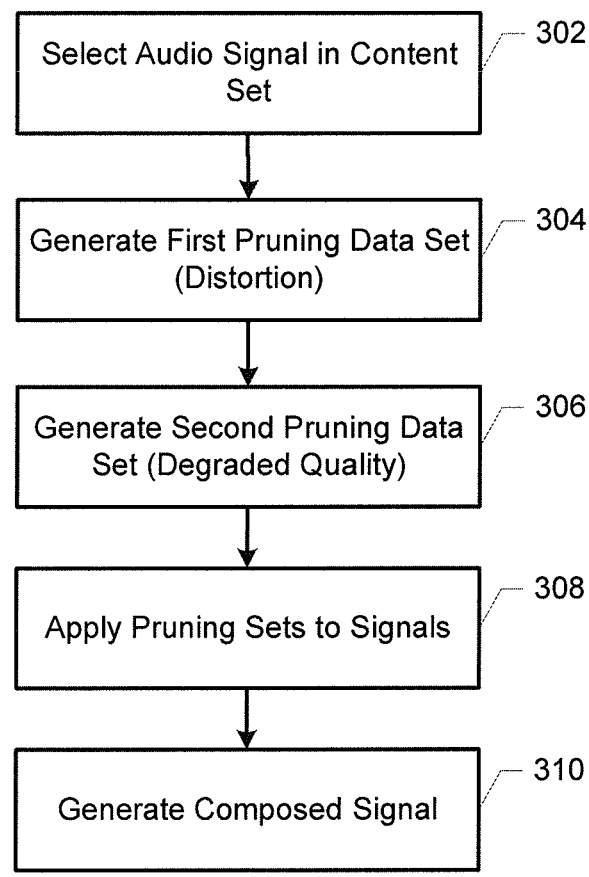
Figure 4:
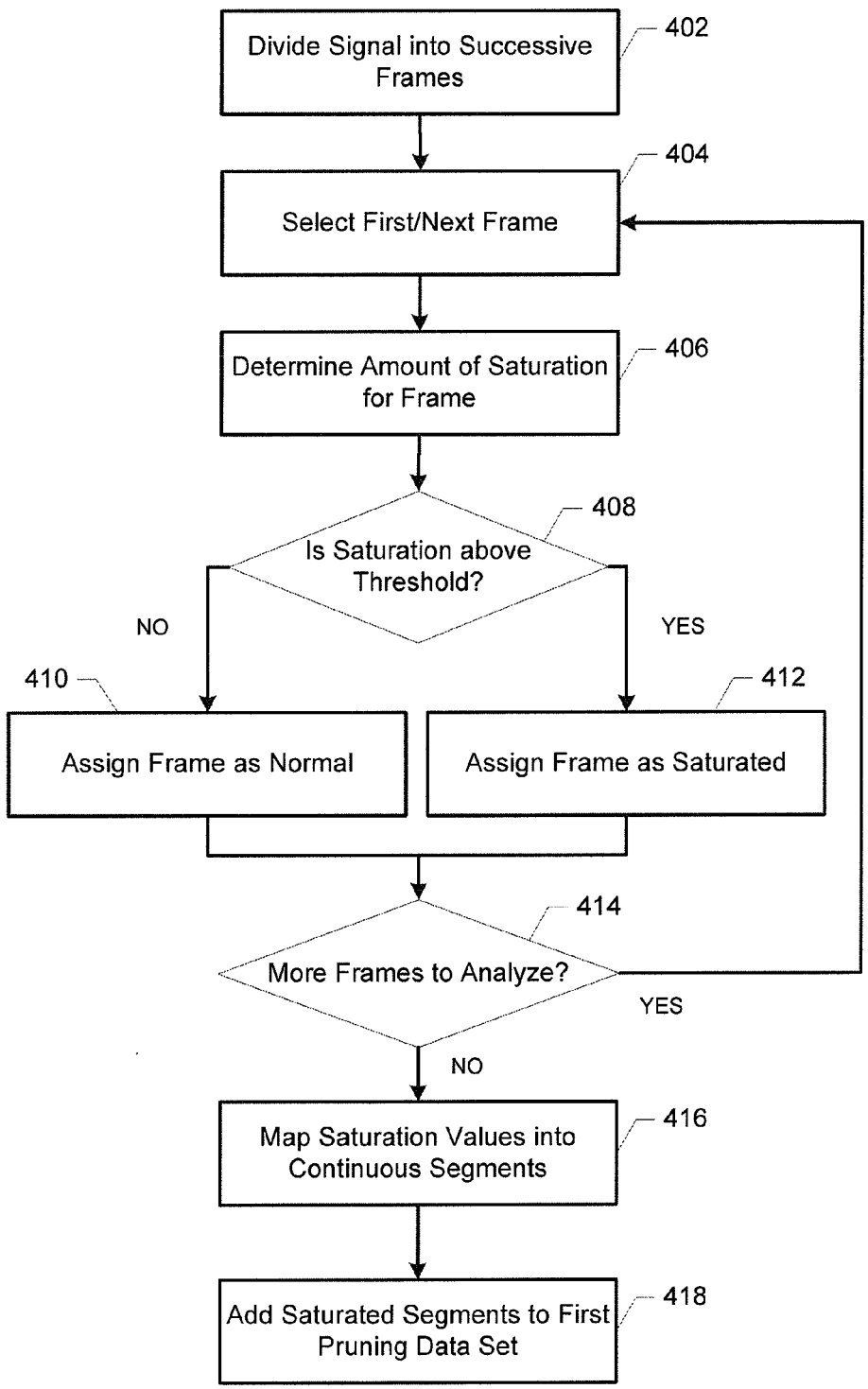
Figure 5:
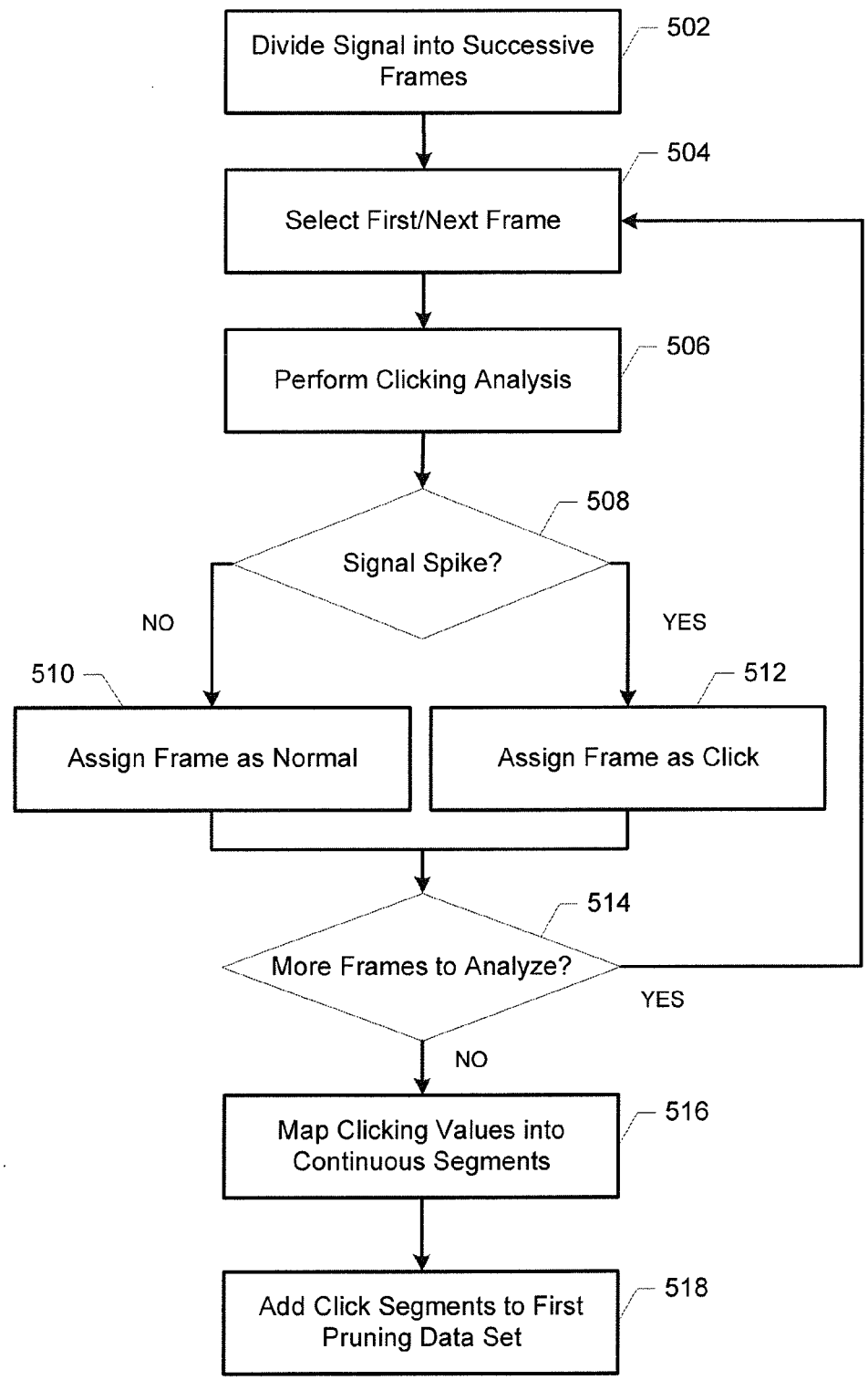
Figure 6:
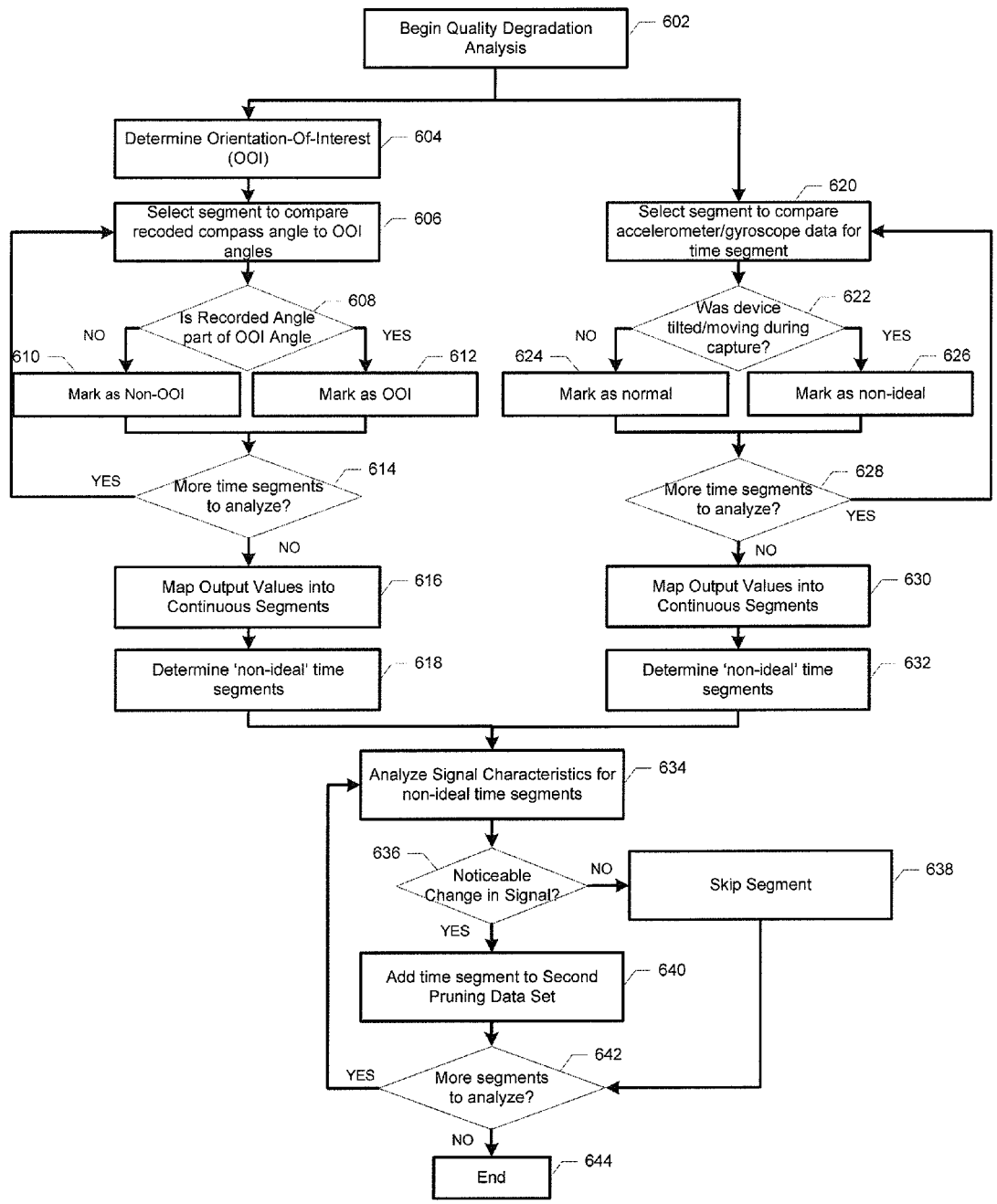
Figure 7:
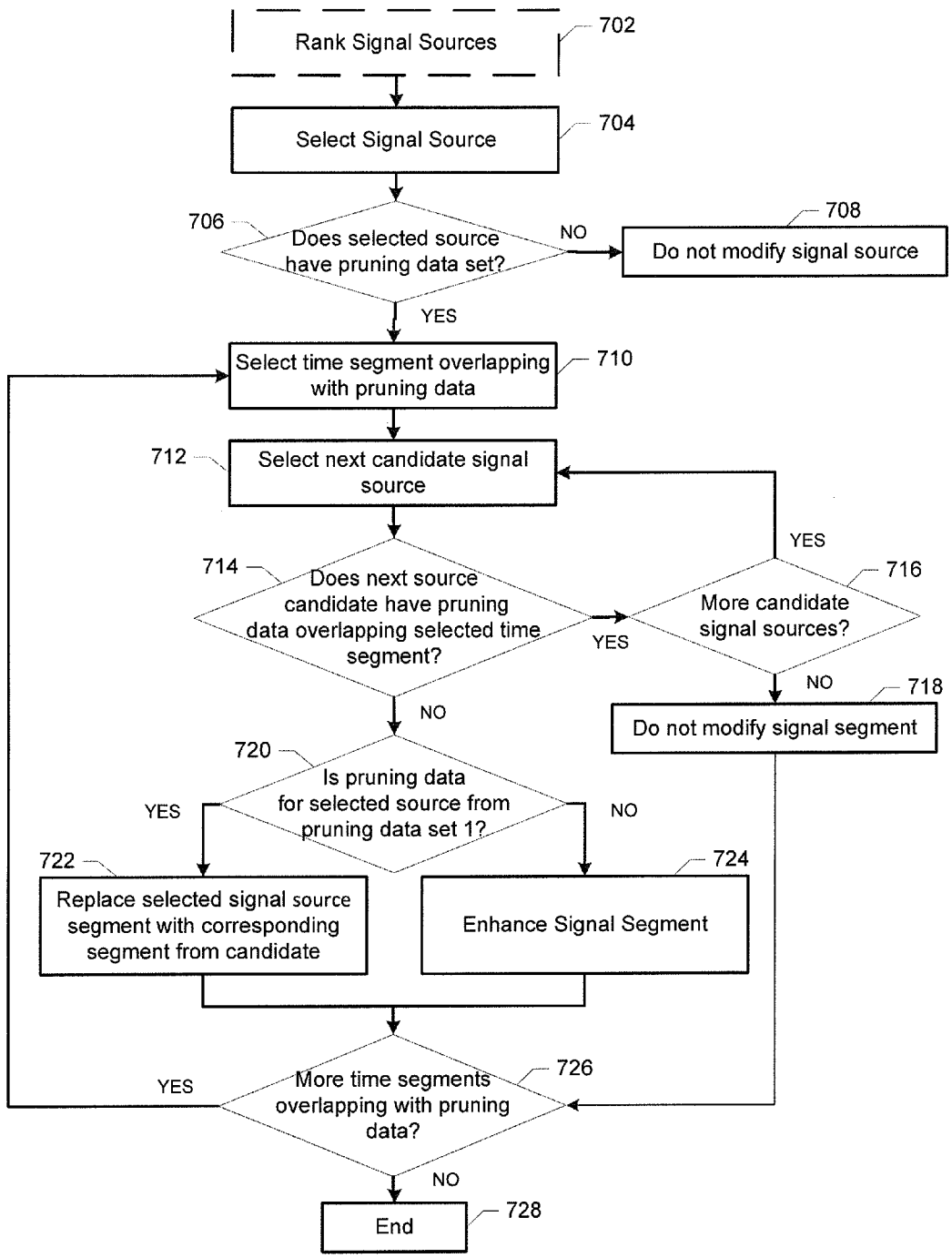
Figure 8:
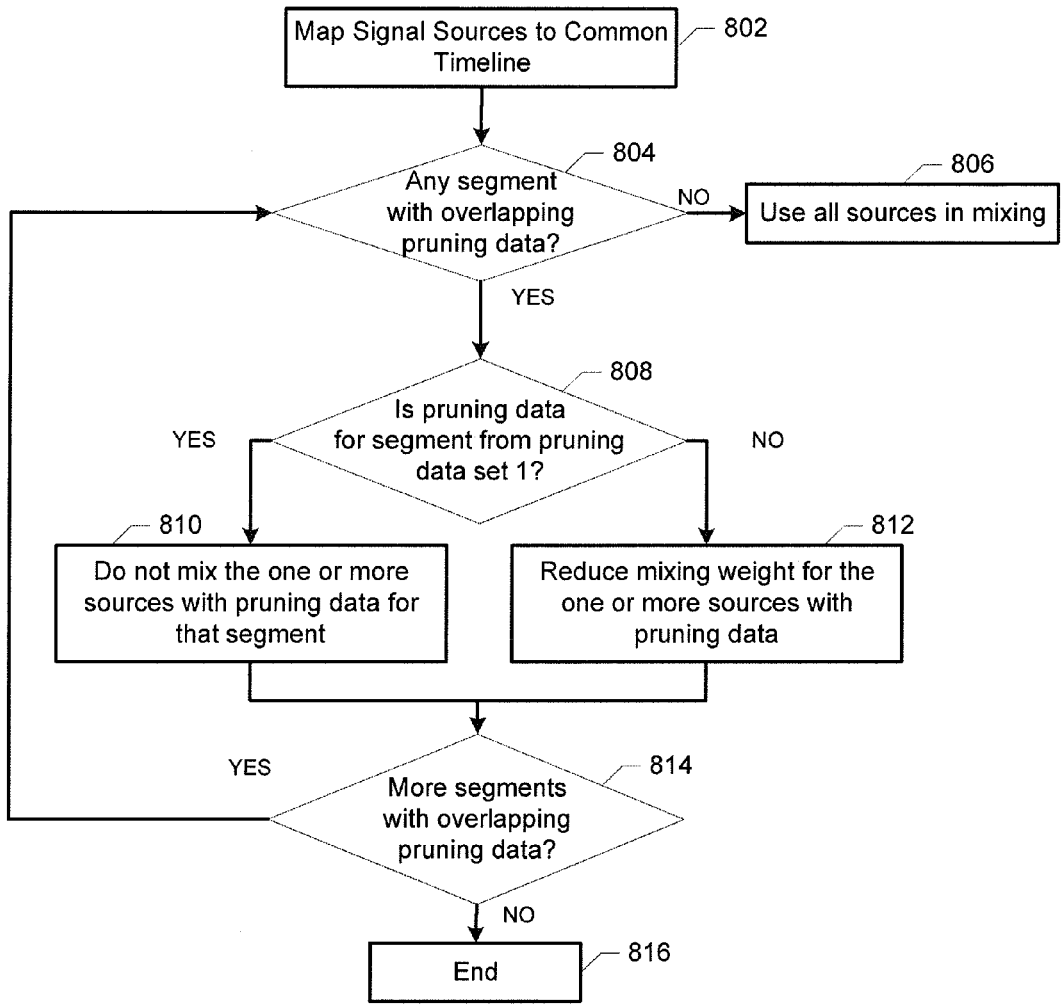
Figure 9:
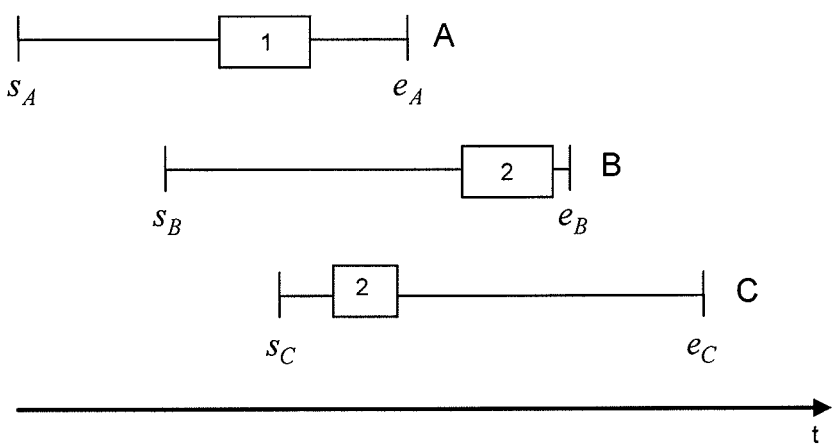

Having thus described certain embodiments of the invention in general terms, reference will now be made to the accompanying drawings, which are not necessarily drawn to scale, and wherein:

FIG. 1 is a recording environment where multi-user content may be captured and shared in accordance with an example embodiment of the present invention;

FIG. 2 is a block diagram of an apparatus that may be specifically configured in accordance with an example embodiment of the present invention;

FIG. 3 is a flow chart illustrating operations performed by an apparatus of FIG. 2 that is specifically configured in accordance with an example embodiment of the present invention;

FIG. 4 is a flow chart illustrating operations for distortion analysis performed by an apparatus in accordance with an example embodiment of the present invention;

FIG. 5 is a flow chart illustrating operations for distortion analysis performed by an apparatus in accordance with an example embodiment of the present invention;

FIG. 6 is a flow chart illustrating operations for degradation analysis performed by an apparatus in accordance with an example embodiment of the present invention;

FIG. 7 is a flow chart illustrating operations for signal composition performed by an apparatus in accordance with an example embodiment of the present invention;

FIG. 8 is a flow chart illustrating operations for signal composition performed by an apparatus in accordance with an example embodiment of the present invention; and FIG. 9 is a diagram illustrating combined signals in a common timeline in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention to compose audio signals for content in a multi-user environment that provide a high quality audio signal that best represents the content as captured and uploaded by the plurality of users. In this regard, a method, apparatus and computer program product of an example embodiment may analyze the audio signals for a set of uploaded content and prune low quality segments before composing the audio signal that is to be provided to end users.

To provide multi-user rendered content for sharing with other users, content from multiple users must first be uploaded to the multi-user content server and may then be combined to provide rendered content to be shared with end users. However, the content may generally be captured by a plurality of devices and the quality may vary among the plurality of different captures of the event. For example, the plurality of devices may generally each independently capture and upload content corresponding to an event and the captured content from a particular device may contain distortions and may vary in quality as devices are moved during capturing of the audio and/or video. To provide a positive user experience of the rendered multi-user content, the uploaded content should be rendered to provide the best quality for each audio and/or video segment. For example, audible distortions should be minimized in the composition signal and the quality should not vary significantly over time, that is, segments of the composed signal should be comparable to other segments of the signal.

FIG. 1 illustrates a multi-user environment where an example embodiment of the present invention may be used. The environment 100 consists of a plurality of mobile devices 104 that are arbitrarily positioned within the environment to capture content of an event 102. The content may be, for example, audio, video, still images, or any combination of such. The mobile device 104 may be embodied as a variety of different mobile devices including as a mobile telephone, a personal digital assistant (PDA), a laptop computer, a tablet computer, a camera, a video recorder, or any of numerous other computation devices, content generation devices, content consumption devices or combinations thereof. Although described herein in conjunction with mobile devices, the environment may include one or more fixed or stationary devices, such as one or more fixed cameras, a desktop computer, or the like, in addition to or instead of the mobile devices.

The content captured by one of the plurality of mobile devices 104 may be uploaded immediately or may be stored and uploaded at a future time. The plurality of mobile devices 104 may also record timestamps for the content being captured, and such timestamps may be based on a local device time signal or on external signals, such as timing from Global Positioning System (GPS) signals or Network Time Protocol (NTP) signals. The plurality of mobile devices 104 may also capture position data corresponding to the location where the content is being captured, such as through the use of Global Positioning System (GPS) coordinates, Cellular Identification (Cell-ID), or Assisted GPS (A-GPS). The plurality of mobile devices 104 may also capture direction/orientation data corresponding to the recording direction/orientation, such as by using compass, accelerometer or gyroscope data. The captured content, e.g. audio, video, and/or still image data, from a mobile device 104 is then transmitted through network 108, such as to a multi-user content server 106. In this regard, network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 108 may include a cellular radio access network, an 802.11, 802.16, 802.20, and/or WiMax network. Further, the network 108 may include a public network, such as the Internet, a private network, such as an intranet, or combinations thereof.

The multi-user content server 106 receives the uploaded content from the plurality of mobile devices 104. The captured content may be uploaded to the multi-user content server 106 during or upon the completion of capturing or at a later time than the original capture. The multi-user content server 106 may combine the captured content from one or more mobile devices 104, such as one or more mobile devices that are in close proximity, to provide rendered content to be shared with end users. The end users may be users who uploaded content or other users who wish to receive rendered content from an event.

To provide rendered content, the multi-user content server 106 may first align the content uploaded from a plurality of users into a content set to allow generation of the rendered content using the best media segments from the plurality of users.

After content from multiple users is available at the multi-user content server 106, the content may be rendered such that the downloaded/streamed content utilizes content from the different users in various ways. For example, the content may be rendered so as to provide the best media segments from multiple contributing users to provide the best end user experience of the multi-user rendered content. End users may also be offered content that represents the multi-user content from various points of view that has been created in various manners, such as by equally sharing content from different users, selecting the best view as a function of time, maximizing or minimizing the viewing experience (that is, for each view select the view that is the most different from the different users or for each view select the view that is most similar from the different users), etc.

An end user may select content on the multi-user content server 106 that corresponds to a particular listening and/or viewing position at an event that the end user wishes to receive through end user device 110. The end user device 110 may be embodied as a variety of different mobile devices including as a mobile telephone, a personal digital assistant (PDA), a laptop computer, a tablet computer, a camera, a video recorder, an audio/video player, or any of numerous other computation devices, content generation devices, content consumption devices or combinations thereof. The end user device 110 may alternatively be embodied as a variety of different stationary or fixed computing devices, such as a desktop computer, a television, a game console, a multimedia device, or the like. Multi-user content server 106 may then render content corresponding to the selected listening/viewing position that the end user selected and cause the rendered content to be transmitted to end user device 110. Alternatively, if the proximity of the captured content is small, the multi-user content server 106 may provide only a single listening/viewing position to the end user.

The system of an embodiment of the present invention may include an apparatus 200 as generally described below in conjunction with FIG. 2 for performing one or more of the operations set forth by FIGS. 3 through 8 and also described below. In this regard, the apparatus may be embodied by the mobile device 104, end user device 110, or content server 106 of FIG. 1.

It should also be noted that while FIG. 2 illustrates one example of a configuration of an apparatus 200 for capturing and rendering multi-user content, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, the apparatus 200 for capturing and rendering multi-user content in accordance with one example embodiment may include or otherwise be in communication with one or more of a processor 202, a memory 204, a communication interface 206, a user interface 208, a camera/microphone 210, a sensor 212, and a clock 214. In instances in which the apparatus is embodied by an end user device 110, the apparatus need not necessarily include a camera/microphone and a sensor and, in instances in which the apparatus is embodied by a content server 106, the apparatus need not necessarily include a user interface, a camera/microphone and a sensor. As such, these components have been illustrated in dashed lines to indicate that not all instantiations of the apparatus include those components.

In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor 202. Additionally or alternatively, the memory device could be configured to store instructions for execution by the processor.

In some embodiments, the apparatus 200 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 206 may be any means such as a device or circuitry embodied in either hardware or a combination of hardware and software that is configured to receive and/or transmit data from/to a network and/or any other device or module in communication with the apparatus 200, such as by supporting communications with the multi-user content server 106. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 200 may include a user interface 208 that may, in turn, be in communication with the processor 202 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

In some example embodiments, such as instances in which the apparatus is embodied as a mobile device 104, the apparatus 200 may include an audio and video capturing element, such as a camera/microphone 210, video module and/or audio module, in communication with the processor 202. The audio/video capturing element may be any means for capturing an image, video and/or audio for storage, display or transmission. For example, in an example embodiment in which the audio/video capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image and/or video. Alternatively, the camera may include only the hardware needed to view an image, while a memory device 204 of the apparatus stores instructions for execution by the processor in the form of software necessary to create a digital image file from a captured image. In an example embodiment, the camera may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 2, in instances in which the apparatus is embodied as a mobile device 104, the apparatus 200 may also include a timing source 214, such as a clock, to provide device timing data (e.g. local timestamps) for captured content.

In some example embodiments, such as instances in which the apparatus is embodied as a mobile device 104, the apparatus 200 may also include a sensor 212, such as a GPS receiver, a compass, an accelerometer, and/or a gyroscope that may be in communication with the processor 202 and may be configured to receive timing signals and to detect changes in position, motion and/or orientation of the apparatus.

The method, apparatus, and computer program product may now be described in conjunction with the operations illustrated in FIG. 3. In this regard, the apparatus 200 may include means, such as the processor 202, the communication interface 206, or the like, for receiving captured content from one or more of a plurality of devices, such as mobile device 104 (not shown). The apparatus 200 may further include means, such as the processor 202, the memory 204, or the like, for assembling the uploaded captured content into one or more content sets based on the content (not shown). The apparatus 200 may include means, such as the processor 202, or the like, for selecting one or more of a plurality of signals from a content set. See block 302 of FIG. 3.

As shown in block 304 of FIG. 3, the apparatus 200 may include means, such as the processor 202, the memory 204, or the like, for generating a first set of pruning data for the one or more selected signals. For example, the apparatus 200 may analyze the one or more signals to determine if there are distortions in the one or more signals.

As shown in block 306 of FIG. 3, the apparatus 200 may also include means, such as the processor 202, or the like, for generating a second set of pruning data for the one or more selected signals. For example, the apparatus 200 may analyze the one or more signals to determine if there are segments of degraded quality in the one or more signals.

The apparatus 200 may also include means, such as the processor 202 or the like, for applying the pruning sets to the one or more signals to determine how to compose the signal that is to be shared in the multi-user environment. See block 308 of FIG. 3. For example, the apparatus 200 may determine segments of the one or more signals that should be replaced if a better segment is available in another of the one or more signals, or the apparatus 200 may determine which of the one or more signals should be mixed together to form a composed signal.

As shown in block 310 of FIG. 3, the apparatus 200 may include means, such as the processor 202, the memory 204, or the like, for generating a composed signal to be shared in the multi-user environment.

The method, apparatus, and computer program product may now be described in conjunction with the operations illustrated in FIG. 4. In this regard, the apparatus 200 may include means, such as the processor 202, or the like, analyzing a selected signal for distortion, such as saturation.

The apparatus 200 may include means, such as the processor 202, the memory 204, or the like, for dividing a selected signal into a series of successive frames. See block 402 of FIG. 4. For example, the signal may be divided into successive frames of short duration, such as 20 milliseconds (ms), to be analyzed. Embodiments may use various durations for dividing the signal into frames, such as from tens of milliseconds to 100-200 milliseconds.

As shown in block 404 of FIG. 4, the apparatus 200 may include means, such as the processor 202 or the like, for selecting the first frame of the one or more successive frames of the selected signal.

As shown in block 406 of FIG. 4, the apparatus 200 may also include means, such as the processor 202, or the like, for determining the amount of saturation for the selected frame.

The apparatus 200 may also include means, such as the processor 202 or the like, for comparing the amount of saturation to a predetermined threshold. See block 408 of FIG. 4. For example, the apparatus 200 may be programmed with a threshold parameter, such as 10%, and may determine if the amount of samples in the frame exceed this threshold parameter.

As shown in block 410 of FIG. 4, the apparatus 200 may include means, such as the processor 202, the memory 204, or the like, for indicating a frame as "normal" if the amount of saturation does not exceed the threshold parameter.

As shown in block 412 of FIG. 4, the apparatus 200 may include means, such as the processor 202, the memory 204, or the like, for indicating a frame as "saturated" if the amount of saturation meets or exceeds the threshold parameter.

As shown in block 414 of FIG. 4, the apparatus 200 may include means, such as the processor 202 or the like, for determining whether there are additional frames to be analyzed for the selected signal. If there are additional frames to be analyzed, the operation returns to block 404 to select the next frame and repeats operation of blocks 406 through 414. If there are no additional frames to be analyzed, the operation continues to block 416.

The apparatus 200 may also include means, such as the processor 202, the memory 204, or the like, for mapping the indicated values for each of the one or more frames of the selected signal to continuous segments. See block 416 of FIG. 4. For example, the apparatus 200 may merge successive frames that have the same indicated value, i.e. normal or saturated, to create larger segments of the selected signal that have the same indicated value. The apparatus 200 may further include means, such as the processor 202 or the like, for filtering the mapped segments such that short duration segments between larger segments of the opposite value may be converted to the same value as the larger segments. For example, if a short duration normal segment falls between two larger saturated segments, the short duration normal segment may be changed to indicate saturated so as to create one saturated segment comprising the three original mapped segments. A similar operation may occur for a short duration saturation segment between two larger normal segments.

The apparatus 200 may also include means, such as the processor 202, the memory 204, or the like, for adding the mapped segments indicated as saturated to a first pruning data set. See block 418 of FIG. 4.

Through the operations of FIG. 4, the apparatus 200 may determine segments of the selected signal where distortions are most audible. Typically human hearing does not perceive very short duration distortions as annoying unless they occur frequently. The saturation analysis of FIG. 4 is useful for instances where a user (with a recording device, such as mobile device 104) is too close to the audio source causing the captured signal to saturate.

The method, apparatus, and computer program product may now be described in conjunction with the operations illustrated in FIG. 5. In this regard, the apparatus 200 may include means, such as the processor 202, or the like, analyzing a selected signal for distortion, such as for clicking. The apparatus 200 may include means, such as the processor 202, the memory 204, or the like, for dividing a selected signal into a series of successive frames. See block 502 of FIG. 5. For example, the signal may be divided into successive frames of short duration, such as 75 milliseconds (ms), to be analyzed. Embodiments may use various durations for dividing the signal into frames, such as from 50 ms up to 200-300 ms.

As shown in block 504 of FIG. 5, the apparatus 200 may include means, such as the processor 202 or the like, for selecting the first frame of the one or more successive frames of the selected signal.

As shown in block 506 of FIG. 5, the apparatus 200 may also include means, such as the processor 202, or the like, for performing clicking analysis for the selected frame.

For example, clicking analysis is useful for cases where a device, such as mobile device 104, accidentally, or intentionally, hits something causing short duration spikes to the audio signal. In one example embodiment, clicking analysis is performed by comparing the energy of a current frame to the energy of a previous and a next frame. For example, let the current frame be $f_t$ and the energy of current frame be $e^f_t$. The current frame is indicated 'click' if:

$$e_t^f > E \cdot e_{t-1}^f \text{ and } e_t^f > E \cdot e_{t+1}^f \quad (1)$$

where E is a level difference multiplier for the previous and next frame, for example, 3 dB.

As shown in block 508 of FIG. 5, the apparatus 200 may also include means, such as the processor 202, or the like, for determining if there is a signal spike, such as according to Equation (1), for the selected frame.

As shown in block 510 of FIG. 5, the apparatus 200 may also include means, such as the processor 202, the memory 204, or the like, for indicating a frame as 'normal' if there is not a signal spike for the selected frame, such as where Equation (1) is not valid.

As shown in block 512 of FIG. 5, the apparatus 200 may also include means, such as the processor 202, the memory 204, or the like, for indicating a frame as 'click if there is a signal spike for the selected frame, such as where Equation (1) is valid.

As shown in block 514 of FIG. 5, the apparatus 200 may include means, such as the processor 202 or the like, for determining whether there are additional frames to be analyzed for the selected signal. If there are additional frames to be analyzed, the operation returns to block 504 to select the next frame and repeats operation of blocks 506 through 514. If there are no additional frames to be analyzed, the operation continues to block 516.

The apparatus 200 may also include means, such as the processor 202, the memory 204, or the like, for mapping the indicated values for each of the one or more frames of the selected signal to continuous segments. See block 516 of FIG. 5. For example, the apparatus 200 may merge successive frames that have the same indicated value, i.e. normal or click, to create larger segments of the selected signal that have the same indicated value. The apparatus 200 may further include means, such as the processor 202 or the like, for filtering the mapped segments such that short duration segments between larger segments of the opposite value may be converted to the same value as the larger segments. For example, if a short duration normal segment falls between two larger click segments, the short duration normal segment may be changed to indicate click so as to create one click segment comprising the three original mapped segments. A similar operation may occur for a short duration click segment between two larger normal segments.

The apparatus 200 may also include means, such as the processor 202, the memory 204, or the like, for adding the mapped segments indicated as click to a first pruning data set. See block 518 of FIG. 5.

The method, apparatus, and computer program product may now be described in conjunction with the operations illustrated in FIG. 6. In this regard, the apparatus 200 may include means, such as the processor 202, or the like, for analyzing a selected signal for degraded quality. See block 602 of FIG. 6. For example, the apparatus 200 may be analyze data from one more sensors, that was included in the content upload, in combination with audio characteristics for a corresponding time period to find segments where the signal is degraded as a result of movement of the recording device, such as mobile device 104, during capturing.

As shown in block 604 of FIG. 6, the apparatus 200 may include means, such as the processor 202, the memory 204, or the like, for determining an orientation-of-interest (OOI) for a from the sensor data, such as compass data, that describes the OOI angles (e.g. dominant interest points in the compass plane) for the captured signal. For example, the OOI angles for the signal may be obtained using histogram analysis and finding the dominant compass plane sections for the signal.

As shown in block 606 of FIG. 6, the apparatus 200 may also include means, such as the processor 202, or the like, for selecting a time segment of the signal to compare the recorded compass angle for the time segment to the OOI angles.

The apparatus 200 may also include means, such as the processor 202 or the like, for comparing the OOI angles to the recorded compass angle for a time segment of the signal to determine if the recorded compass angle is part of the OOI angle. See block 608 of FIG. 6. For example, if the difference of the recorded angle with respect to the OOI angle is greater that a threshold, for example 45°, the apparatus 200 may determine the recorded angle time segment is not part of the OOI angle. While, 45° is provided as an example here, embodiments of the present invention may use a different threshold parameter in the determination.

As shown in block 610 of FIG. 6, the apparatus 200 may include means, such as the processor 202, the memory 204, or the like, for indicating a time segment as "non-OOI" if the apparatus 200 determines the recorded angle time segment is not part of the OOI angle.

As shown in block 612 of FIG. 6, the apparatus 200 may include means, such as the processor 202, the memory 204, or the like, for indicating a time segment as "OOI" if the apparatus 200 determines the recorded angle time segment is part of the OOI angle.

As shown in block 614 of FIG. 6, the apparatus 200 may include means, such as the processor 202 or the like, for determining whether there are additional time segments to be analyzed for the selected signal. If there are additional time segments to be analyzed, the operation returns to block 606 to select the next time segment and repeats operation of blocks 608 through 614. If there are no additional time segments to be analyzed, the operation continues to block 616.

The apparatus 200 may also include means, such as the processor 202, the memory 204, or the like, for mapping the indicated values for each of the one or more time segments of the selected signal to continuous segments. See block 616 of FIG. 6. For example, the apparatus 200 may merge successive time segments that have the same indicated value, i.e. OOI or non-OOI, to create larger segments of the selected signal that have the same indicated value. The apparatus 200 may further include means, such as the processor 202 or the like, for filtering the mapped segments such that short duration segments between larger segments of the opposite value may be converted to the same value as the larger segments. For example, if a short duration OOI segment falls between two larger non-OOI segments, the short duration OOI segment may be changed to indicate non-OOI so as to create one non-OOI segment comprising the three original mapped segments. A similar operation may occur for a short duration non-OOI segment between two larger OOI segments.

The apparatus 200 may also include means, such as the processor 202, the memory 204, or the like, for adding the mapped segments indicated as non-OOI to a "non-ideal" segment set. See block 618 of FIG. 6.

As shown in block 620 of FIG. 6, the apparatus 200 may include means, such as the processor 202 or the like, for selecting a time segment of the signal to analyze accelerometer and/or gyroscope data for the time segment.

The apparatus 200 may also include means, such as the processor 202 or the like, for an analyzing accelerometer and/or gyroscope data for a time segment of the signal to determine if the device, such as mobile device 104, was tilted or moving during capturing. See block 622 of FIG. 6.

As shown in block 624 of FIG. 6, the apparatus 200 may include means, such as the processor 202, the memory 204, or the like, for indicating a time segment as "normal" if the apparatus 200 determines the device was not tilted/moving during capturing of the signal.

As shown in block 626 of FIG. 6, the apparatus 200 may include means, such as the processor 202, the memory 204, or the like, for indicating a time segment as "non-ideal" if the apparatus 200 determines the device was tilted/moving during capturing of the signal.

As shown in block 628 of FIG. 6, the apparatus 200 may include means, such as the processor 202 or the like, for determining whether there are additional time segments to be analyzed for the selected signal. If there are additional time segments to be analyzed, the operation returns to block 620 to select the next time segment and repeats operation of blocks 622 through 628. If there are no additional time segments to be analyzed, the operation continues to block 630.

The apparatus 200 may also include means, such as the processor 202, the memory 204, or the like, for mapping the indicated values for each of the one or more time segments of the selected signal to continuous segments. See block 630 of FIG. 4. For example, the apparatus 200 may merge successive time segments that have the same indicated value, i.e. normal or non-ideal, to create larger segments of the selected signal that have the same indicated value. The apparatus 200 may further include means, such as the processor 202 or the like, for filtering the mapped segments such that short duration segments between larger segments of the opposite value may be converted to the same value as the larger segments. For example, if a short duration normal segment falls between two larger non-ideal segments, the short duration normal segment may be changed to indicate non-ideal so as to create one non-ideal segment comprising the three original mapped segments. A similar operation may occur for a short duration non-ideal segment between two larger normal segments.

The apparatus 200 may also include means, such as the processor 202 or the like, for adding the mapped segments indicated as non-ideal to a "non-ideal" segment set for the signal. See block 632 of FIG. 6.

The apparatus 200 may also include means, such as the processor 202 or the like, for analyzing the signal characteristics corresponding to the non-ideal time segments. See block 634 of FIG. 6. For example, the apparatus 200 may analyze the energy of the audio for a period before the time segment with non-ideal sensor data, during the time segment, and after the time segment. In one example, the energy of the audio may be analyzed for 20 seconds before the start of time segment, during the time segment, and for 20 seconds after the end of the time segment. If there is a in the energy levels that meets or exceeds a determined threshold, for example 3 dB or higher, between preceding and current periods and/or between current and following periods, the time segment may be indicated for inclusion in the second pruning data set for the signal.

As shown in block 636 of FIG. 6, the apparatus 200 may include means, such as the processor 202 or the like, for determining whether there energy exceeded the threshold for the time segment.

As shown in block 638 of FIG. 6, the apparatus 200 may include means, such as the processor 202 or the like, for skipping the time segment if the apparatus 200 determines the energy does not exceed the threshold for the time segment, for example, the audio level does not change significantly even though the audio capture is changing as a result of the movement of the recording device.

As shown in block 640 of FIG. 6, the apparatus 200 may include means, such as the processor 202 or the like, for adding the time segment to the second pruning data set if the apparatus 200 determines the energy exceeded the threshold for the time segment.

As shown in block 642 of FIG. 6, the apparatus 200 may include means, such as the processor 202 or the like, for determining whether there are additional time segments to be analyzed for the selected signal. If there are additional time segments to be analyzed, the operation returns to block 634 to select the next time segment and repeats operation of blocks 636 through 642. If there are no additional time segments to be analyzed, the operation continues to block 644 where quality degradation analysis for the selected signal ends.

The method, apparatus, and computer program product may now be described in conjunction with the operations illustrated in FIG. 7. In some example embodiments, the signal may be composed by using one uploaded signal from the content set at a time to represent the audio content. In this regard, the apparatus 200 may optionally include means, such as the processor 202, or the like, for ranking the one or more signal sources for the uploaded content set. See block 702 of FIG. 7. For example, to use one source at a time, the apparatus 200 may use some form of ranking to determine which source provides the best signal quality at that time. The ranking may provide a high level ranking but there still may be segments of the signal where the signal has short-term quality problems. In one embodiment, the apparatus 200 may switch from one signal source to another when new signal sources start or old signal sources end in a common timeline. Alternatively, in some embodiments where ranking information is not available, random selection of signal sources may be used.

As shown in block 704 of FIG. 7, the apparatus 200 may include means, such as the processor 202 or the like, for selecting the signal source. For example, the apparatus 200 may select the highest ranked signal source for the time period or may randomly select a signal source.

The apparatus 200 may also include means, such as the processor 202, or the like, for determining whether the selected signal source has one or more pruning data sets. See block 706 of FIG. 7.

As shown in block 708 of FIG. 7, if the selected signal source does not have one or more pruning data sets, the apparatus 200 may include means, such as the processor 202, or the like, for indicating that the signal should not be modified, but provided as is, for the shared multi-user content.

As shown in block 710 of FIG. 7, if the selected signal source has one or more pruning data sets, the apparatus 200 may include means, such as the processor 202, or the like, for selecting for modification a first time segment of the signal that has overlapping pruning data.

As shown in block 712 of FIG. 7, the apparatus 200 may include means, such as the processor 202 or the like, for selecting a next candidate signal source for the time segment. For example, where ranking of signal sources is used, the apparatus 200 may select the signal source with the next highest ranking. Alternatively, where ranking data is not available, the apparatus 200 may randomly select a signal source that contains the selected time segment.

The apparatus 200 may also include means, such as the processor 202 or the like, for determining whether the candidate signal source has pruning data that overlaps the corresponding time segment. See block 714 of FIG. 7.

As shown in block 716 of FIG. 7, if the candidate signal source also has pruning data overlapping the corresponding time segment, the apparatus 200 may include means, such as the processor 202 or the like, for determining whether there are additional candidate source signals that may be analyzed to provide a modification for the corresponding time segment. If there are additional candidate signal sources, operation returns to block 712 to select the next candidate signal source and operation continues as described above.

As shown in block 718 of FIG. 7, if there are no additional candidate source signals to try, the apparatus 200 may include means, such as the processor 202 or the like, for indicating that the signal for the time segment should not be modified and operation continues to block 726 which will be described below. For example, if there are no candidate signal sources that have a higher quality signal for the corresponding time segment, that time segment for the selected signal source is left unchanged and used in the composition of the signal to be shared for the multi-user content.

Returning to block 714, if the candidate signal source does not have pruning data overlapping the corresponding time segment from the selected signal source, operation continues to block 720.

As shown in block 720 of FIG. 7, the apparatus 200 may include means, such as the processor 202 or the like, for determining if the pruning data for the selected time segment of the selected signal source is pruning data of a type from the first pruning data set. For example, the signal for that segment from the selected signal source is distorted. If the pruning data is from the first pruning data set, operation continues to block 722.

As shown in block 722 of FIG. 7, the apparatus 200 may include means, such as the processor 202 or the like, for replacing the segment from the selected signal source with the corresponding segment from the candidate signal source. For example, the distorted segment from the selected signal source is replaced by the better quality segment from the candidate signal source.

As shown in block 724 of FIG. 7, if it is determined at block 720 that the pruning data for the selected time segment of the selected signal source is not pruning data of a type from the first pruning data set, it is pruning data from the second pruning data set, the apparatus 200 may include means, such as the processor 202 or the like, for enhancing the segment from the selected signal source using the corresponding segment from the candidate signal source. For example, if the pruning data is from the second pruning data set, the signal may be of a degraded quality, so the apparatus 200 may enhance the segment by combing the segment from the two signal sources. In some embodiments, the apparatus 200 may enhance the signal segment by jointly mixing the corresponding segments from the two signal sources. In another embodiment, the apparatus 200 may enhance the signal segment by using a weighted mixing of the two sources, for example where the segment for the selected signal source is given less weight than the corresponding segment in the candidate signal source when the mixing is performed, the signal for that segment from the selected signal source is distorted.

As shown in block 726 of FIG. 7, once the modification for the selected segment is complete, the apparatus 200 may include means, such as the processor 202 or the like, for determining if there are additional time segments for the selected signal source that have overlapping pruning data. If it is determined that there are additional time segments having overlapping pruning data, operation returns to block 710, where the next time segment with overlapping pruning data is selected an the operation continues recursively through block 726.

If it is determined at block 726 that there are no additional time segments having overlapping pruning data, operation continues to block 728 where operation ends.

The method, apparatus, and computer program product may now be described in conjunction with the operations illustrated in FIG. 8. In some example embodiments, the signal may be composed by jointly mixing the signals from all the signal sources of the uploaded content set as a function of time. In this regard, the apparatus 200 may include means, such as the processor 202, or the like, for mapping the two or more signal sources for the uploaded content set to a common timeline. See block 802 of FIG. 8, and further described below with respect to FIG. 9. For example, the apparatus 200 may determine a common timeline by determining the start time of the earliest of the two or more signals (e.g. $S_A$ of FIG. 9) and the end time of the latest of the two or more signals (e.g. $S_C$ of FIG. 9) and constructing a common timeline for said start time through said end time and mapping the two or more signals to the common timeline (e.g. timeline t of FIG. 9).

As shown in block 804 of FIG. 8, the apparatus 200 may include means, such as the processor 202 or the like, for determining whether the one or more of the signal sources has pruning data overlapping a time segment of its signal.

As shown in block 806 of FIG. 8, if the none of the two or more signal sources have overlapping pruning data, the apparatus 200 may include means, such as the processor 202, or the like, for indicating that the all of the two or more signal sources should be jointly mixed as is for the composition of the signal for the shared multi-user content.

If it is determined that any of the signal sources has pruning data overlapping a time segment of its signal, the apparatus 200 may include means, such as the processor 202 or the like, for selecting the first time segment along the common timeline with overlapping pruning data and operation continues to block 808.

As shown in block 808 of FIG. 8, if it is determined that a segment has overlapping pruning data, the apparatus 200 may include means, such as the processor 202 or the like, for determining if the pruning data for the selected time segment for the one or more signal sources is pruning data of a type from the first pruning data set. For example, the signal for that segment from the signal source may be distorted. If the pruning data is from the first pruning data set, operation continues to block 810.

As shown in block 810 of FIG. 8, the apparatus 200 may include means, such as the processor 202 or the like, for indicating that the one or more signal sources should not be included in the signal mixing for the corresponding time segment.

As shown in block 812 of FIG. 8, if it is determined at block 808 that the pruning data for the selected time segment is not pruning data of a type from the first pruning data set, it is pruning data from the second pruning data set, the apparatus 200 may include means, such as the processor 202 or the like, for reducing the weight of the one or more signal sources with second set pruning data corresponding to the time segment. For example, the weighting of the signal source is reduced such that it contributes less to the signal mixing than the other signal sources during the corresponding time segment.

As shown in block 814 of FIG. 8, once the modification for the selected segment is complete, the apparatus 200 may include means, such as the processor 202 or the like, for determining if there are additional time segments along the common timeline with overlapping pruning data. If it is determined that there are additional time segments having overlapping pruning data, operation returns to block 804, where the next time segment with overlapping pruning data is selected and the operation continues recursively through block 814.

If it is determined at block 814 that there are no additional time segments having overlapping pruning data, operation continues to block 816 where operation ends.

FIG. 9 shows an example of creation of a common timeline and mixing of signal sources, as provided in some of the embodiments described with regard to FIG. 8. FIG. 9 illustrates uploaded content comprising overlapping times for source A, source B, and source C, with start and end times of $s_A$ and $e_A$, $s_B$ and $e_B$, $s_C$ and $e_C$, respectively, for the three sources. Source A has first pruning data set (shown as 1), source B has second pruning data set (shown as 2), and source C has second pruning data set (shown as 2) determined for time segments as indicated in FIG. 9. The apparatus 200 may generate the signal composition by combining the three sources as follows.

For time period from $s_A$ to $s_B$, only source A is used as it is the only available source for that time period. For time period from $s_B$ to $s_C$, sources A and B are jointly mixed with the exception of time segment which overlaps with the first pruning data set for source A. This time segment of source A is not used as it contains distorted signal, thus for this time segment only source B is used. For time period from $s_C$ to $e_A$, the sources A, B, and C are all jointly mixed with the exception of (1) the time segment which overlaps with pruning data set 1 for source A where only sources B and C are used, and (2) the time segment which overlaps with pruning data set 2 for source C where all three sources are used but source C is weighted such that its contribution to the composed signal is smaller compared to source A and B. For the time period from $e_A$ to $e_B$, sources B and C are jointly mixed with the exception of time segment which overlaps with pruning data set 2 for source B where all both sources are used but source B is weighted such that its contribution to the composed signal is smaller compared to source C. For the time period from $e_B$ to $e_C$, only source C is used as it is the only available source for that time period.

As described above, FIGS. 3 through 8 illustrate flowcharts of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present invention and executed by a processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   a. assigning two or more corresponding content data into a set of content data;
   b. generating a first pruning data set for each one of a plurality of signals within the content set;
   c. generating a second pruning data set for each one of a plurality of signals within the content set; and
   d. generating a composed signal from signals within the plurality of signals in the content set using the first pruning data set and the second pruning data set wherein the data sets are used for signals ranking and selection.

2. A method according to claim 1 wherein the plurality of signals comprise audio signals.

3. A method according to claim 1 wherein the first pruning data set for the one of the plurality of signals comprises segments of said signal that are distorted.

4. A method according to claim 1 wherein the second pruning data set for the one of the plurality of signals comprises segments of said signal that are degraded.

5. A method according to claim 1 wherein the generating the first pruning data set further comprises determining an amount of saturation for a signal and wherein the amount of saturation exceeds a threshold parameter.

6. A method according to claim 5 wherein the generating the composed signal using the first pruning data set further comprises replacing segments of the one of the plurality of signals.

7. A method according to claim 1 wherein the generating the first pruning data set further comprises determining a spike for a signal and wherein the energy of the signal spike exceeds a threshold parameter.

8. A method according to claim 7 wherein the generating the composed signal using the first pruning data set further comprises replacing segments of the one of the plurality of signals.

9. A method according to claim 1 wherein the generating the second pruning data set further comprises analyzing sensor data and signal characteristics for a corresponding segment of a signal.

10. A method according to claim 9 wherein the sensor data further comprises one or more of compass data, accelerometer data, or gyroscope data corresponding to a capturing period of signal content.

11. A method according to claim 1 wherein the generating the composed signal using the second pruning data set further comprises enhancing segments of the one of the plurality of signals.

12. A method according to claim 11 wherein enhancing a segment further comprises weighting corresponding segments for two or more of the plurality of signals and using the weighting during mixing of the two or more of the plurality of signals to generate a composed signal.

13. An apparatus comprising at least one processor and at least one memory including computer program instructions, the at least one memory and the computer program instructions configured to, with the at least one processor, cause the apparatus at least to:
   assign two or more corresponding content data into a set of content data;
   generate a first pruning data set for each one of a plurality of signals within the content set;
   generate a second pruning data set for each one of a plurality of signals within the content set; and
   generate a composed signal from signals within the plurality of signals in the content set using the first pruning data set and the second pruning data set wherein the data sets are used for signals ranking and selection.

14. An apparatus according to claim 13 wherein the plurality of signals comprise audio signals.

15. An apparatus according to claim 13 wherein the first pruning data set for the one of the plurality of signals comprises segments of said signal that are distorted.

16. An apparatus according to claim 13 wherein the second pruning data set for the one of the plurality of signals comprises segments of said signal that are degraded.

17. An apparatus according to claim 13 wherein the at least one memory and the computer program instructions are further configured to, with the at least one processor, cause the apparatus to generate the first pruning data set by at least determining an amount of saturation for a signal and wherein the amount of saturation exceeds a threshold parameter.

18. An apparatus according to claim 17 wherein the at least one memory and the computer program instructions are further configured to, with the at least one processor, cause the apparatus to generate the composed signal using the first pruning data set by at least replacing segments of the one of the plurality of signals.

19. An apparatus according to claim 13 wherein the at least one memory and the computer program instructions are further configured to, with the at least one processor, cause the apparatus to generate the first pruning data set by at least determining a spike for a signal and wherein the energy of the signal spike exceeds a threshold parameter.

20. An apparatus according to 13 wherein the at least one memory and the computer program instructions are further configured to, with the at least one processor, cause the apparatus to enhance a segment of the one of the plurality of signals by at least weighting the corresponding segments for two or more of the plurality of signals and using the weighting during mixing of the two or more of the plurality of signals to generate a composed signal.

* * * * *

UNITED STATES PATENT AND TRADEMARK OFFICE
CERTIFICATE OF CORRECTION

| | | |
|---|---|---|
| PATENT NO. | : 9,479,887 B2 | Page 1 of 1 |
| APPLICATION NO. | : 13/622414 | |
| DATED | : October 25, 2016 | |
| INVENTOR(S) | : Ojanpera | |

It is certified that error appears in the above-identified patent and that said Letters Patent is hereby corrected as shown below:

In the Claims

Column 20,
Line 52, "according to 13" should read --according to claim 13--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*